United States Patent [19]

Suzuki et al.

[11] Patent Number: 5,438,651
[45] Date of Patent: Aug. 1, 1995

[54] COLOR ADJUSTMENT FOR SMOOTHING A BOUNDARY BETWEEN COLOR IMAGES

[75] Inventors: Shoji Suzuki; Tadakazu Kusunoki; Masahiro Mori, all of Kawasaki, Japan

[73] Assignee: Fujitsu Limited, Kawasaki, Japan

[21] Appl. No.: 968,078

[22] Filed: Oct. 29, 1992

[30] Foreign Application Priority Data

| Oct. 30, 1991 [JP] Japan | 3-283478 |
|---|---|
| Oct. 30, 1991 [JP] Japan | 3-283479 |
| Jan. 28, 1992 [JP] Japan | 4-012732 |

[51] Int. Cl.⁶ .................................. G06T 11/00
[52] U.S. Cl. ......................... 395/131; 395/133; 395/135
[58] Field of Search ............ 395/119, 121, 126, 129, 395/131, 132, 133, 135; 358/22

[56] References Cited

U.S. PATENT DOCUMENTS

| 4,823,183 | 4/1989 | Jackson et al. | 358/22 |
|---|---|---|---|
| 4,963,979 | 10/1990 | Sendelweck | 358/22 X |
| 5,153,937 | 10/1992 | Wobermin et al. | 395/121 |
| 5,194,941 | 3/1993 | Grimaldi et al. | 358/22 |

FOREIGN PATENT DOCUMENTS

| 0096084 | 12/1983 | European Pat. Off. |
|---|---|---|
| 0357407 | 3/1990 | European Pat. Off. |
| 3110222 | 8/1982 | Germany. |
| 4014740 | 11/1990 | Germany. |
| 1-195583 | 8/1989 | Japan. |

OTHER PUBLICATIONS

Foley et al. Computer Graphics Principles and Practice 1990.
S. Inoue, "An Object Extraction Method for Image Synthesis," *IEICE*, vol. J74–D–II, No. 10, pp. 1411–1418.

*Primary Examiner*—Almis R. Jankus
*Attorney, Agent, or Firm*—Staas & Halsey

[57] ABSTRACT

The present invention generally relates to processing of color images and more particularly to a method for smoothing a color boundary between an object and a background. A method for changing the color of an object against the color of a background to smooth the color boundary between the object and the background includes the steps of: identifying the color of the boundary part of the object as a boundary color; obtaining a mixing ratio for mixing the color of the object and the color of the background to produce the boundary color; changing the color of the object relative to the color of the background; and changing the boundary color while maintaining the mixing ratio substantially constant at the boundary part before and after the color change process.

12 Claims, 13 Drawing Sheets

COLOR ADJUSTMENT FOR SMOOTHING A BOUNDARY BETWEEN COLOR IMAGES

BACKGROUND OF THE INVENTION

The present invention generally relates to processing of color images and more particularly to a method for smoothing a color boundary between an object and a background.

In designing various colorful goods or products such as cloths or automobiles, a computerized design system is employed. In such a computerized design system that uses a computer and a color monitor, a color image of the product is produced on the color monitor. By changing the color of the product, one can evaluate the visual effect of the product without producing a prototype each time. Generally, such a computerized design system is equipped with a sophisticated human interface for facilitating the operation by the operator.

Conventionally, the modification of color in the color images has been achieved in such a computerized design system by pointing out the image or object displayed in the color monitor, and the color of the pointed object is modified to a target color. The target color may be selected from a color pallet that is displayed on the color monitor as an array of small color elements. Alternatively, the target color may be obtained by actuating various adjustment knobs displayed on the monitor screen by means of the pointing device such as a mouse. By adjusting the color with respect to the three independent components thereof such as lightness, chroma and hue or with respect to the three primary colors such as R (red), G (green) and B (blue), one can obtain any color as desired.

In such a computerized designing of color, the boundary between a pointed object and the background that surrounds the pointed object has been treated either as a part of the object or as a part of the background. When synthesizing a color image from a plurality of color images, an object image located behind another object is treated as a background.

Conventionally, no particular treatment has been applied to the boundary part of such images except for applying a brushing operation in correspondence to the boundary part or applying a blur to the entirety of the image. However, these conventional processes do not provide the desired effect of smoothing the color boundary. Particularly, the brushing operation has to be achieved manually by an operator, and such a process requires substantial time. As a result, there has been a problem in that the boundary part of the composite image appears unnatural to the human perception. Hereinafter, the cause of this problem will be examined in detail.

As already explained, the target color is selected from the color pallet displayed on the monitor screen, and the color of the whole object is changed to the target color. For example, a color picture may be read by an image scanner to produce RGB image data that includes 8-bit data, for example, for each of the R, G and B components. After a part of the color picture is selected by the pointer device and the color thereof changed to the target color, there occurs a problem in that the part that has experienced the color change appears conspicuous to the human perception and provides an unnatural feeling. More specifically, the smooth transition of the color at the boundary part of the object is lost after the color adjustment, and it is believed that a steep change of the color that appears at the boundary as a result of the color adjustment provides the odd feeling to the viewer. There, the viewer feels that the boundary of the object is unnaturally enhanced.

Figure 1:
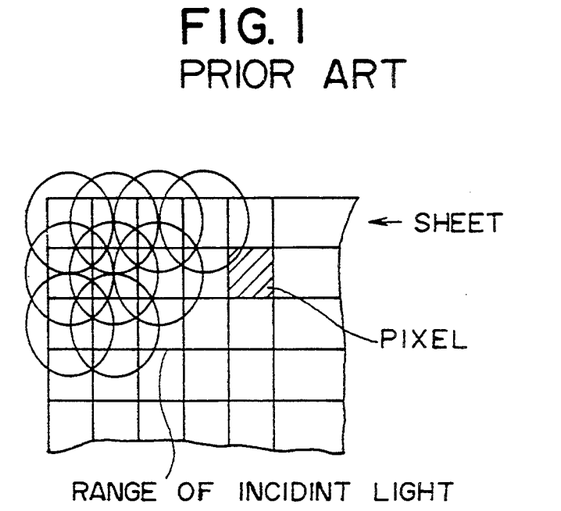
FIG. 1 is a diagram showing a typical conventional process for reading a color image by an optical scanner.

When reading a boundary part of a color image by means of an image scanner, camera, and the like, two colors, one forming a background part of the color image and the other forming an object surrounded by the background, are mixed at the CCD cell or other photoelectric conversion device that has a finite area for optical detection. As represented in FIG. 1 showing a typical situation for reading a color image, it will be noted that each pixel of the detector cell detects the reflection of light from a region larger than the region of the original picture that corresponds to the pixel. In other words, each pixel detects the image in a somewhat defocused state. The reason of this may be attributed to the limited resolution of the optical system. Anyway, the pixel detects an intermediate color that is not included in any of the background and the object as a result of the additive mixture of color stimuli. Thus, it is believed that this mixing of color at the boundary of the object is the reason why the original color image could provide the natural feeling of images. The foregoing boundary of images provides a problem also when synthesizing images. For example, an image of an automobile incorporated into a new background by the computerized designing apparatus generally provides an odd feeling.

In addition to the foregoing problem of boundary processing, one tends to experience a similar problem of unnatural boundary caused by the operational principle of conventional image scanners.

Figure 2:
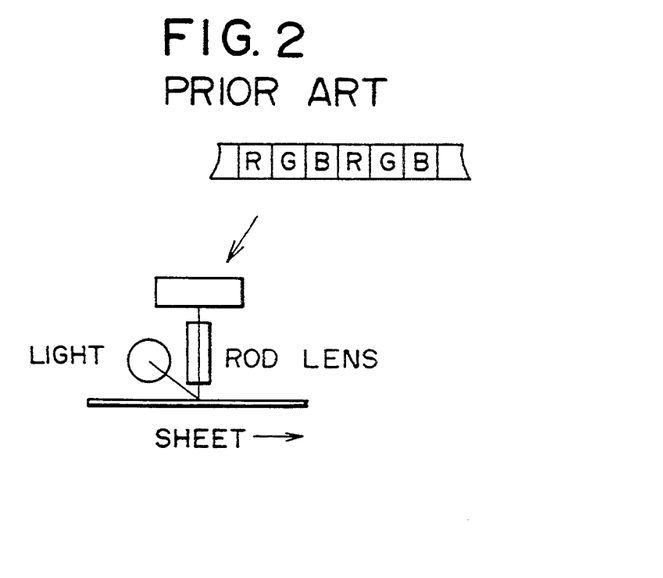
FIG. 2 is a diagram showing the construction of a conventional optical scanner.
Figure 3:
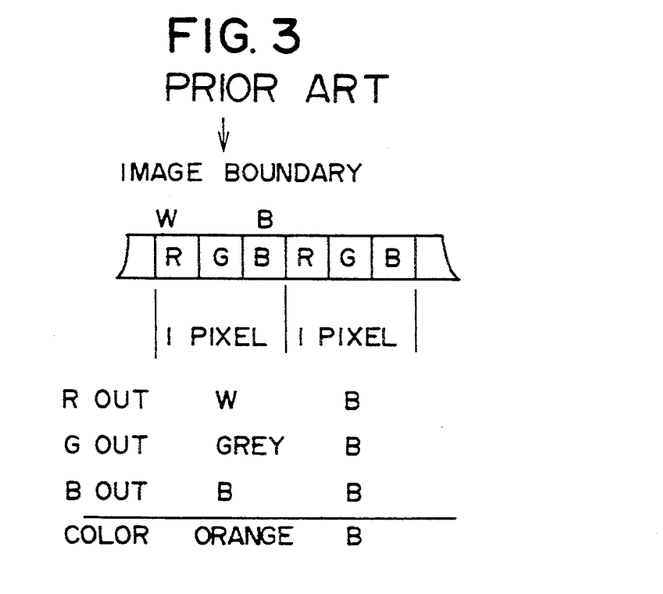
FIG. 3 is a diagram for explaining the appearance of a singular color at the boundary of an object in the image read by the optical scanner of FIG. 2.

Referring to FIG. 2 showing a conventional image scanner of the contact scanning type, an array of photodetector devices is employed. There, the array includes a repetition of three detectors corresponding to the three primary colors R, G and B, wherein these three detectors are separated from each other by a minute but finite distance. In other words, the photodetectors for the R, G and B components are not located exactly at the identical position, and there can be a problem in that these photodetectors may produce, in correspondence to the boundary of the object, a color output that never appears as a result of the simple additive mixture of color stimuli as indicated in FIG. 3. In FIG. 3, it will be noted that there appears an orange color in correspondence to the boundary of a white object surrounded by a black background.

Figure 4:
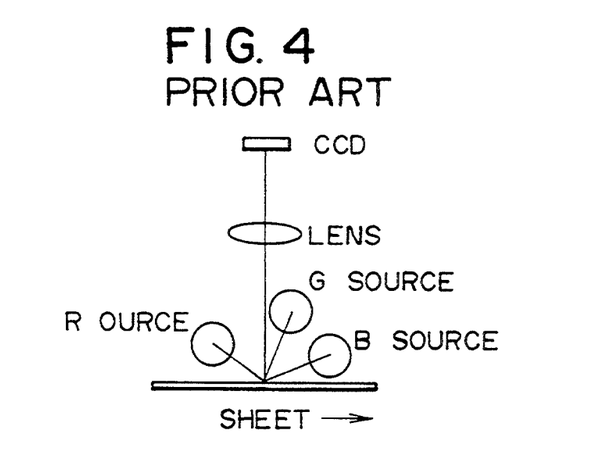
FIG. 4 is a diagram showing the construction of another conventional optical scanner.

FIG. 4 shows another typical construction of the image scanner that switches the light source consecutively for the red color, green color and blue color. Again, it will be noted that an orange color is produced at the boundary between the white image and the black background.

SUMMARY OF THE INVENTION

Accordingly, it is a general object of the present invention to provide a novel and useful process for color adjustment wherein the foregoing problems are eliminated.

Another and more specific object of the present invention is to provide a process for color adjustment of a composite color image wherein a precise adjustment of color is possible including a boundary part of an object that is included in the composite color image.

Another object of the present invention is to provide a process for changing a color of an object that is surrounded by a background and defined by a boundary, relative to a color of said background, said boundary having a boundary color determined as a result of the additive mixture of the color of said object and the color of said background, said method comprising the steps of: (a) identifying said boundary color; (b) obtaining a mixing ratio for mixing the color of said object and the color of said background to produce said boundary color; (c) changing the color of said object relative to the color of said background to implement a color change process; and (d) changing the boundary color while maintaining said mixing ratio substantially constant at said boundary before and after said color change process in said step (c), According to the present invention, the continuity of colors is maintained between the object and the background before and after the color change, and the occurrence of unnatural feeling at the boundary of the object is successfully eliminated. The present invention is applicable not only to the relative change of color of the object with respect to the background but also to the synthesis of a composite image wherein the image of the object is cutout from the original background and implanted to another background.

DETAILED DESCRIPTION OF THE PREFERRED EMBODIMENTS

Figure 6A:
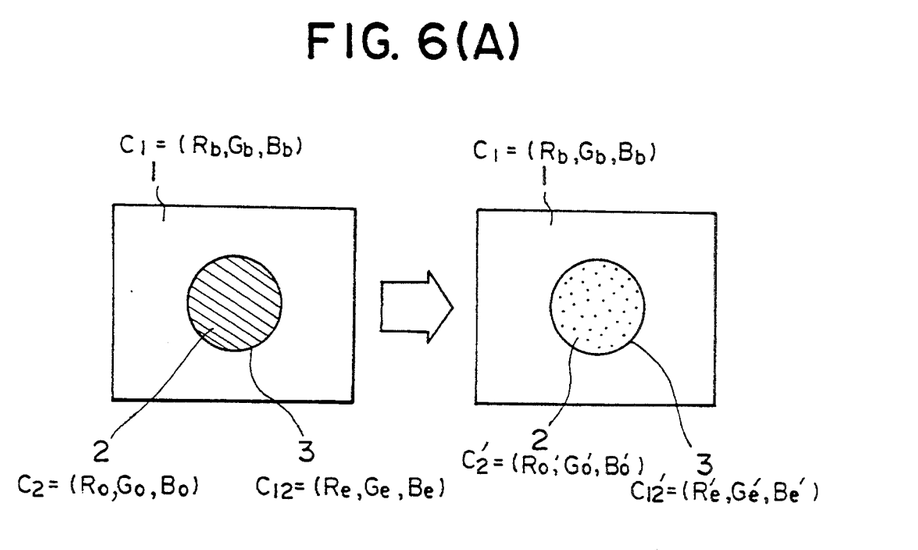
FIGS. 6(A) and 6(B) are diagrams showing the principle of the present invention.
Figure 6B:
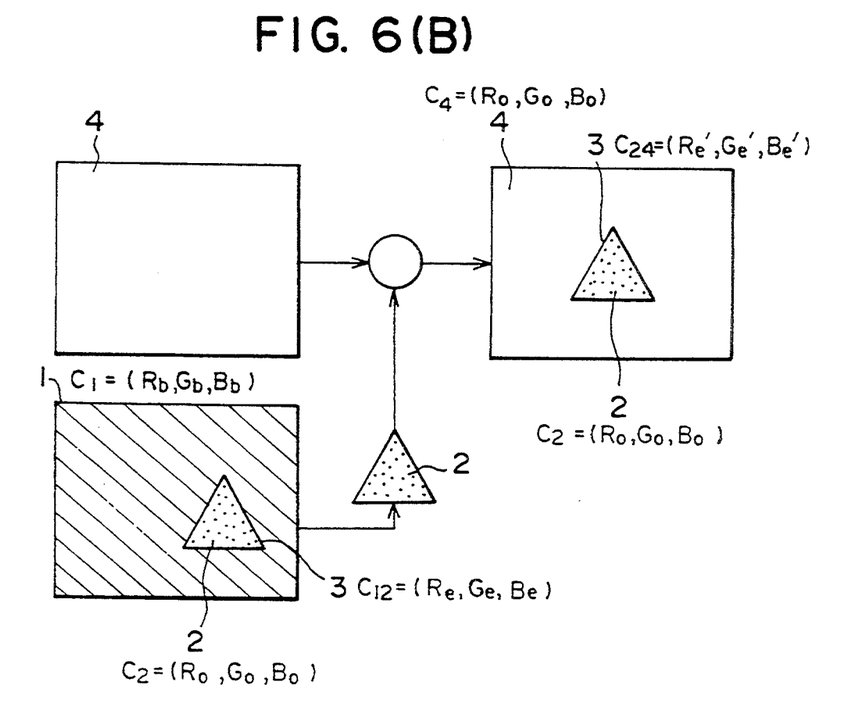

FIGS. 6(A) and 6(B) show the color adjustment process according to a first embodiment of the present invention, wherein FIG. 6(A) shows a modification of the color of an object included in a color background while FIG. 6(B) shows a synthesis of a color image by cutting an image of an object from a background and implanting the same into another background of another color.

Referring to FIG. 6(A), the image includes an object 2 having a color $C_2$ ($=R_o, G_o, B_o$) in a background 1 that has a color $C_1$ ($=R_b, G_b, B_b$), wherein the object 2 is defined by a boundary 3 that has a boundary color $C_{12}$ ($=R_e, G_e, B_e$). There, $R_i, G_i, B_i$ ($i=o, b, e$) represent respectively the red, green and blue color signal components. After the modification, the color $C_1$ of the background remains unchanged, while the color of the object 2 changes from the original color $C_2$ to a modified color $C_2'$ ($=R_o', G_o', B_o'$) and the color of the boundary 3 changes from the original color $C_{12}$ to a modified color $C_{12}'$ ($=R_e', G_e', B_e'$).

In the example of FIG. 6(B) on the other hand, the object 2 is cut from the background 1 and is implanted into another background 4 that has a color $C_4$ ($=R_o', G_o', B_o'$). There, the boundary color of the object 2 changes from $C_{12}$ to $C_{24}$ ($=R_e', G_e', B_e'$) as indicated.

In the present invention, the boundary color such as the color $C_{12}$ or $C_{12}'$ is represented according to the principle of additive mixture of color stimuli such that the boundary color $C_{12}$, for example, is formed as a result of mixing of the color $C_2$ of the object and the color $C_1$ of the background. Further, it is important to note that the ratio of mixing of the color signals to form the boundary color remains unchanged before and after the color modification.

Figure 7A:
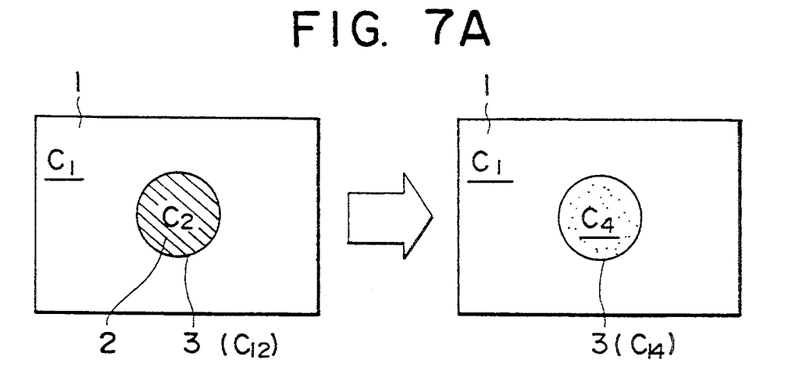
FIGS. 7(A) and 7(B) are diagrams showing the principle of the present invention.
Figure 7B:
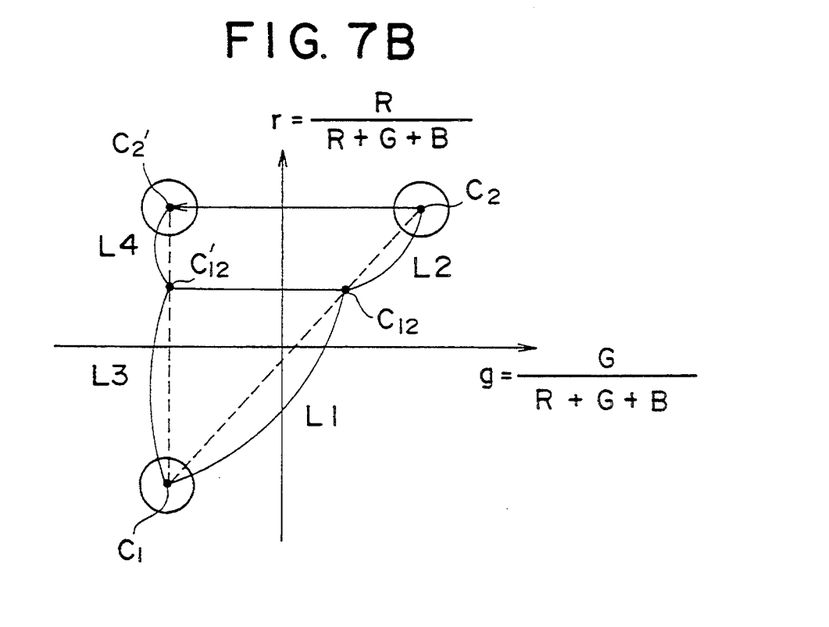

FIG. 7(A) shows the color modification scheme corresponding to FIG. 6(A), wherein FIG. 7(B) shows the principle of color modification in more detail.

Referring to FIG. 7(B) representing the colors $C_1$, $C_2$ and $C_2'$ in the r-g space wherein the axis r represents the normalized R component ($r=R/(R+G+B)$) and the axis g represents the normalized G component ($g=G/(R+G+B)$). There, it will be noted that there holds a relationship $$C_{12} = k_1 \cdot C_2 + k_2 \cdot C_1 \qquad (1)$$

and $$C_{12}' = k_1 \cdot C_2' + k_2 \cdot C_1 \qquad (2)$$

where $k_1$ and $k_2$ are constants and satisfy a relationship $k_1 + k_2 = 1$.

When the condition of Eqs.(1) and (2) are met, it will be noted that the distances $L_1$ and $L_2$ as well as the distances $L_3$ and $L_4$ defined in FIG. 7(B) satisfy a relationship that $k_1 = L_1/(L_1+L_2) = L_4/(L_3+L_4)$, and $k_2 = L_2/(L_1+L_2) = L_3/(L_3+L_4)$.

The foregoing relationship of Eqs.(1) and (2) can be extended easily to the three-dimensional color space R-G-B. There, equations having a form similar to Eqs.(1) and (2) hold true for each R, G and B components of the color image, although the geometrical relationship $k_1 = L_1/(L_1 + L_2) = L_4/(L_3 + L_4)$, and $k_2 = L_2/(L_1 + L_2) = L_3/(L_3 + L_4)$ shown in the two-dimensional projection of FIG. 7(B) does not hold generally except for a special case that the sum of the color components R, G and B remains constant before and after the color change.

It should be noted that the foregoing relationship holds in each pixel that forms the boundary 3. There, the parameters $k_1$ and $k_2$, although held constant in each pixel on the boundary 3 before and after the color modification, generally change when a different pixel is selected on the boundary.

Figure 8A:
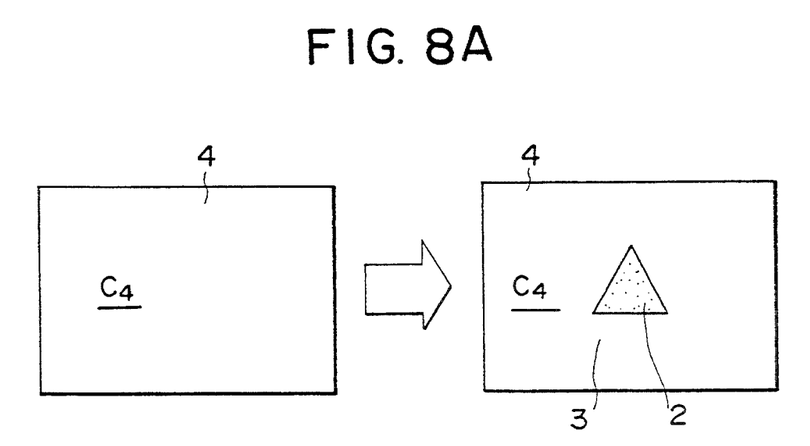
FIGS. 8(A) and 8(B) are diagrams showing the principle of the present invention.
Figure 8B:
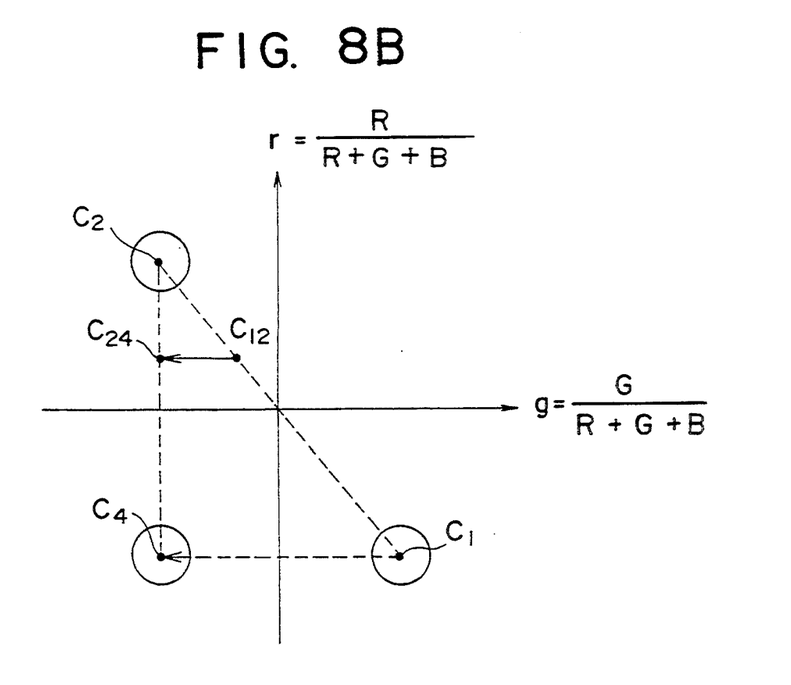

FIG. 8(A), on the other hand, corresponds to the situation of FIG. 6(B) and shows the implantation of an object 2 from the background 1 into the background 4. In this case, the color $C_2$ of the object 2 does not change but the background color changes from $C_1$ to $C_4$. Again, a relationship similar to Eqs.(1) and (2) holds as $$C_{12} = k_1' \cdot C_2 + k_2' \cdot C_1 \qquad (3)$$

and $$C_{24}' = k_1' \cdot C_2 + k_2' \cdot C_4 \qquad (4)$$

where $k_1'$ and $k_2'$ satisfy the relationship $k_1' + k_2' = 1$. Again, the value of the parameters $k_1'$ and $k_2'$ may change depending on the pixel on the boundary 3.

Figure 9:
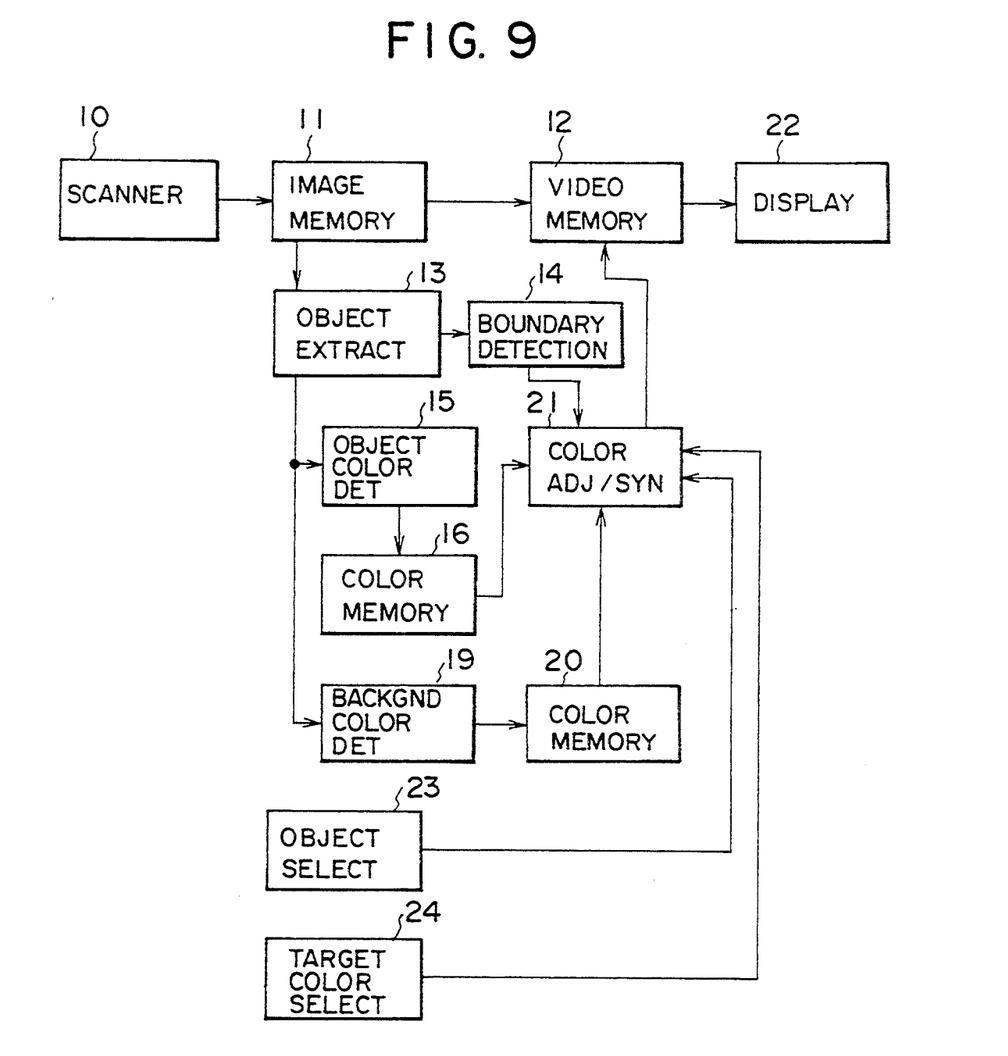
FIG. 9 is a block diagram showing the schematical construction of a color adjustment system used in a first embodiment of the present invention.

FIG. 9 shows the image processing apparatus used in the first embodiment for conducting the image processing including the foregoing color modification and image synthesis.

Referring to FIG. 9, the image processing apparatus includes an image scanner 10 that reads a color image recorded on a sheet. The image scanner 10 produces color image data upon reading in correspondence to each pixel that forms the color image, and the color image data thus produced is supplied to an image memory 11 as usual. The image data is further supplied from the image memory 11 to a video memory 12 and the content of the video memory is displayed at a color monitor 22.

The image data stored in the image memory 11 is further read out, pixel by pixel, by an object detection unit 13 that identifies each of the objects such as the object 2 against the background. The detection of the object may be achieved according to the process described for example in Inoue, S., "An Object Extraction Method for Image Synthesis," IEICE, vol.J74-D-II, No.10, pp.1411–1418, which is incorporated herein by reference. Since the technique for detecting the object is not the subject of the present invention, the description will be omitted. There, the object detection unit 13 produces the image data for the object thus detected as well as the image data for the background, and the image data thus produced at the object detection unit 13 is supplied to a boundary detection unit 14.

Further, the output image data of the unit 13 is supplied to a color extract circuit 15 that detects the color $C_2$ of the object fox each pixel that forms the object 2, and the circuit 15 produces an output color signal indicative of the color of the object. The color signals thus produced by the circuit 15 in correspondence to the pixels are stored in a memory 16. In addition, the output image data of the unit 13 indicative of the background is supplied to a background detection circuit 19 that detects the color $C_1$ of the background 1, and the output of the circuit 19 is stored in a memory 20.

There, the output of the boundary detection unit 14 as well as the output of the color memories 16 and 20 are supplied to a color adjustment unit 21 for conducting the color adjustment and/or image synthesis as described in accordance with the principle described previously. In order to select the object, there is provided an object pointing unit 23 connected to a pointing tool such as a mouse (not illustrated), and the unit 23 supplies an output signal indicative of the object thus selected to the color adjustment unit 21. Thereby, the color adjustment unit recognizes the color $C_1$, $C_2$ and $C_{12}$. Further, there is provided a target color selection unit 24 for selecting the desired target color $C_2'$ or $C_4$ from the color pallet, and the unit 24 supplies an output signal indicative of the target color thus selected to the color adjustment unit 21.

Figure 10:
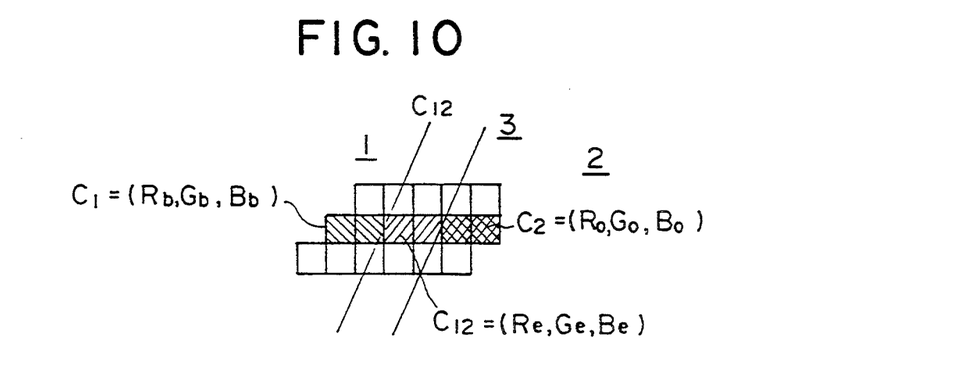
FIG. 10 is a diagram showing the color adjustments achieved at the boundary of an object according to the first embodiment in detail.

FIG. 10 shows the color adjustment carried out in the unit 21. In the illustrated example, the boundary is represented by a band having a width of two pixels, and the pixels forming the band have the boundary color $C_{12}$ that is determined as a result of the additive mixture of the color $C_1$ of the background and the color $C_2$ of the object. When the color $C_1$ or $C_2$ is changed, the boundary color $C_{12}$ experiences a change as described with reference to Eqs.(1)–(4).

Figure 11:
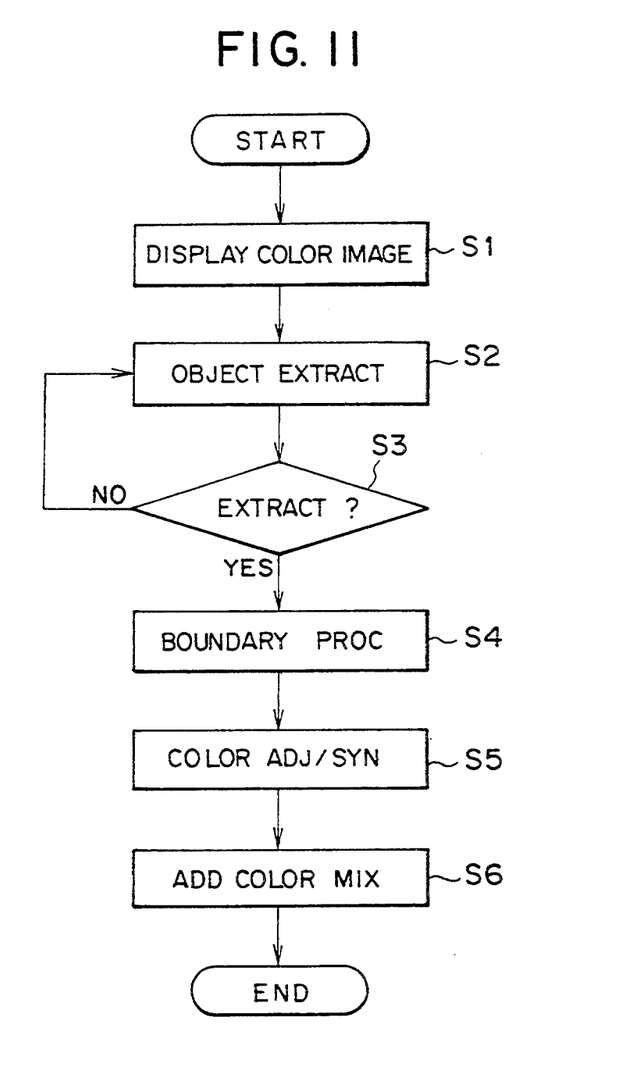
FIG. 11 is a flowchart showing the color adjustment and color image synthesis achieved in the apparatus of FIG. 9.

FIG. 11 shows the flowchart for carrying out the color adjustment according to the present invention. There, a color image of the original picture is displayed on the monitor in a step 1, and the object is extracted in a step S2. After confirming the result of the step 2 in a step S3, the boundary of the object is detected in a step S4 and the color adjustment and/or image synthesis is achieved in a step S5 for the object color or for the background color. Further, the adjustment of the boundary color is achieved in a last step S6.

Figure 12:
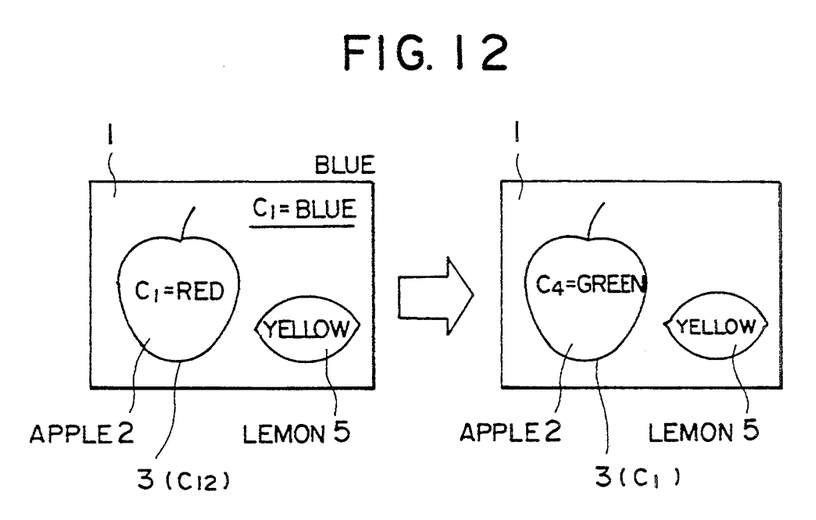
FIG. 12 is a diagram showing the color image processing achieved by the first embodiment of the present invention.
Figure 13:
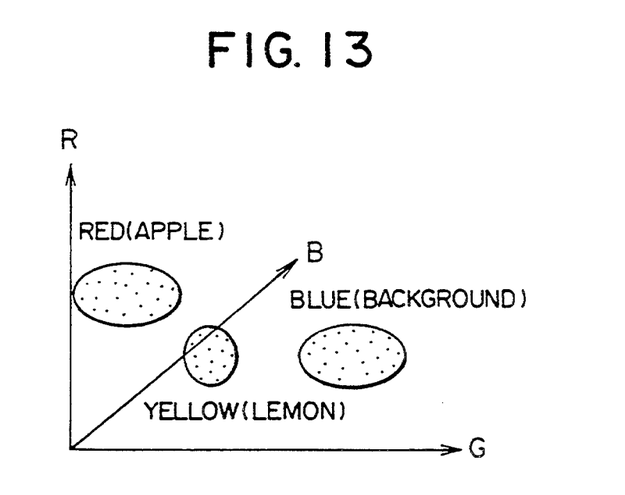
FIG. 13 is a diagram showing the color adjustment achieved by the first embodiment of the present invention.
Figure 14:
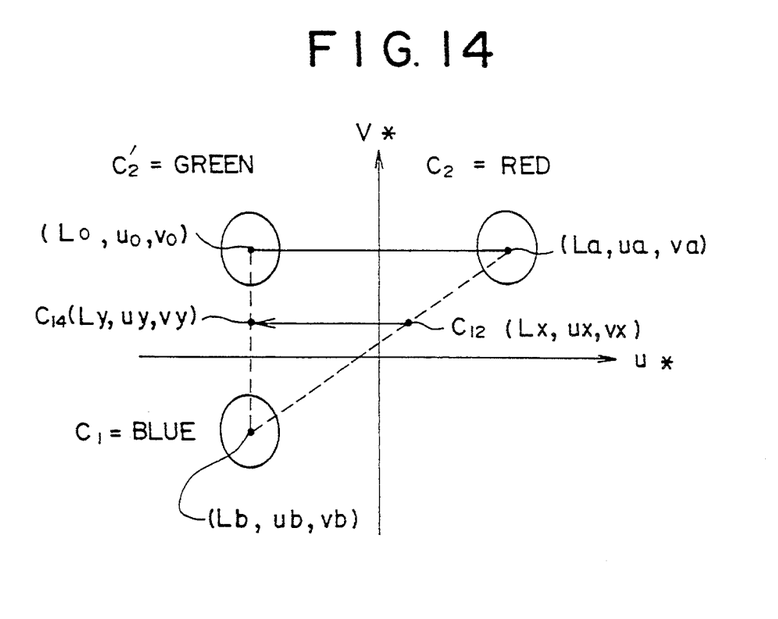
FIG. 14 is a diagram showing the R-G-B color space to which the process of the present invention is applied.
Figure 15:
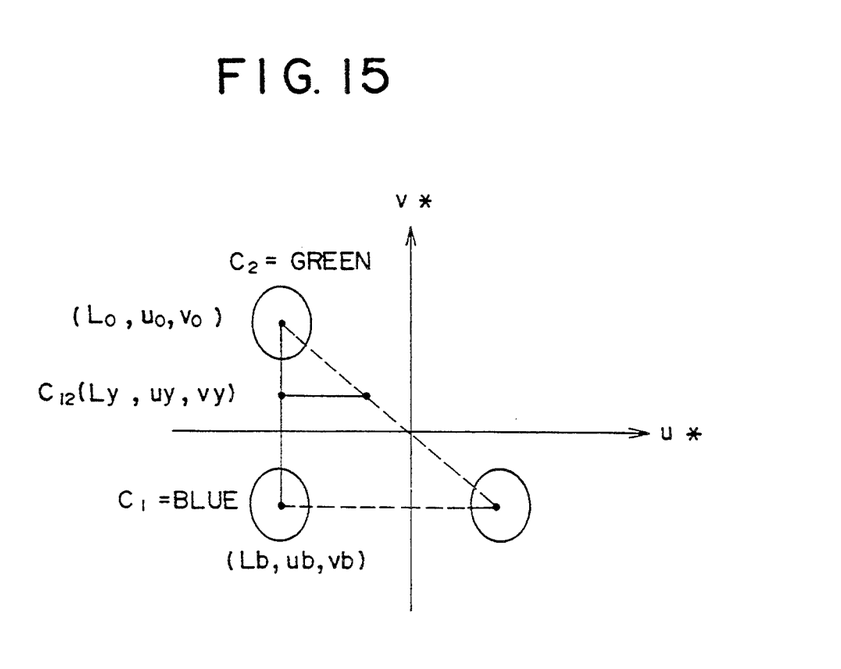
FIG. 15 is a diagram showing the color adjustment represented in the CIELUV space.

FIG. 12 shows an example of the color adjustment achieved by the present invention. In the illustrated example, the images of an apple and a lemon are shown in a blue background, wherein the color of the apple is changed to from red to green. On the other hand, FIG. 13 shows the corresponding color adjustment represented in the R-G-B space. There, the relationship represented in Eqs.(1)–(4) holds as they are, as these equations are derived based upon the R-G-B space. However, the principle of the present invention to change the boundary color according to the principle of the additive mixture of color stimuli is by no means limited to the R-G-B space but can be applicable to any color spaces that are connected to the R-G-B space by a linear or non-linear transformation. For example, FIG. 14 shows the adjustment of the boundary color in the CIELUV color space while FIG. 15 shows the image synthesis also represented in the CIELUV space. Referring to FIGS. 14 and 15, it will be noted that ratio of mixing of color at the boundary part of the object is also held constant before and after the color change in the CIELUV system. Further, the adjustment of the boundary color according to the present invention is applicable also to the hue-chroma-lightness space.

Figure 16:
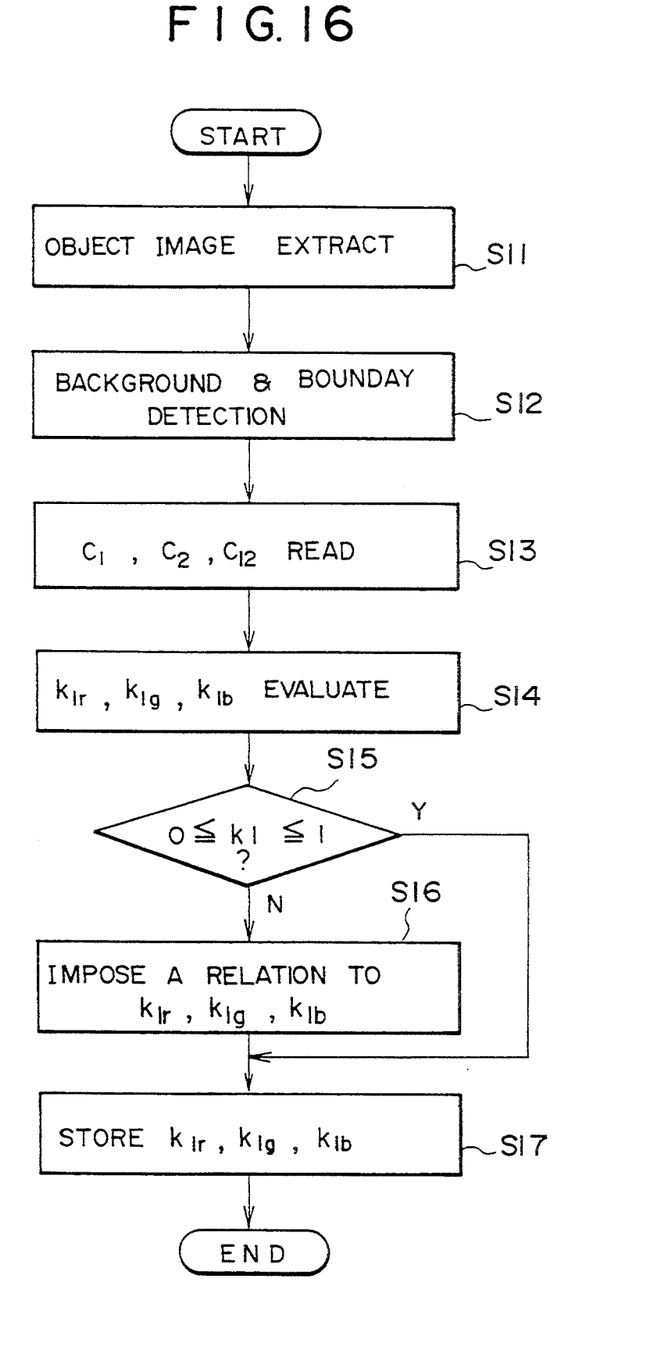
FIG. 16 is a flowchart for showing the noise reduction process according to a second embodiment of the present invention.
Figure 17:
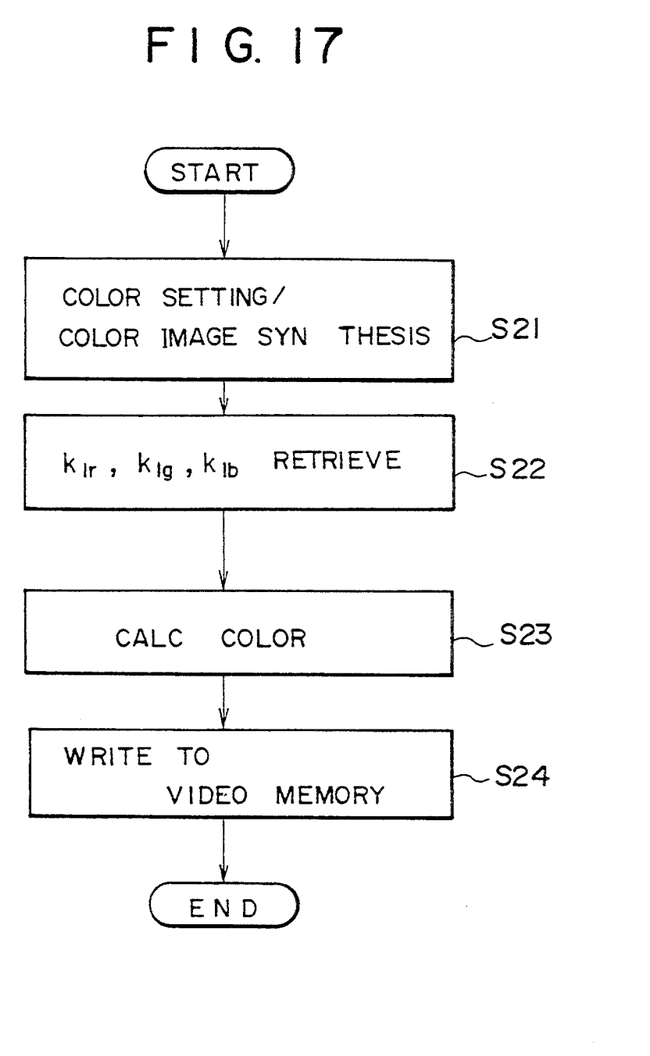
FIG. 17 is another flowchart for showing the noise reduction process of the second embodiment.

Next, a second embodiment of the present invention for eliminating the problem of false color described with reference to FIGS. 2–5 will be described with reference to FIGS. 16 and 17 showing an algorithm of image processing.

In the foregoing Eqs.(1)–(4), it will be noted that the value of the parameters $k_1$ and $k_2$ or $k_1'$ and $k_2'$ generally change depending on the color component. In other words, Eqs.(1) and (2) can be represented as $$R_e = k_{1r}R_o + k_{2r}R_b,\qquad(1')$$

$$G_e = k_{1g}G_o + k_{2g}G_b,\qquad(2')$$

and $$B_e = k_{1b}B_o + k_{2b}B_b,\qquad(3')$$

where there holds a relationship $$k_{1r} + k_{2r} = 1,\ 0 \leq k_{1r},\ k_{2r} \leq 1 \qquad(5)$$

$$k_{1g} + k_{2g} = 1,\ 0 \leq k_{1g},\ k_{2g} \leq 1 \qquad(6)$$

and $$k_{1b} + k_{2b} = 1,\ 0 \leq k_{1b},\ k_{2b} \leq 1 \qquad(7)$$

and the color components $(R_e, G_e, B_e)$, $(R_o, G_o, B_o)$ and $(R_b, G_b, B_b)$ are defined in FIG. 10 in relation with the colors $C_1$, $C_2$ and $C_{12}$.

The foregoing relationship in turn indicates that one can calculate the value of the parameters $k_{1r}, \ldots$ when the value of the color signals $R_e, R_o, R_b, \ldots$ are provided. As long as the principle of additive mixture of color stimuli is valid, the relationship of Eqs.(5)–(7) holds true.

Figure 5:
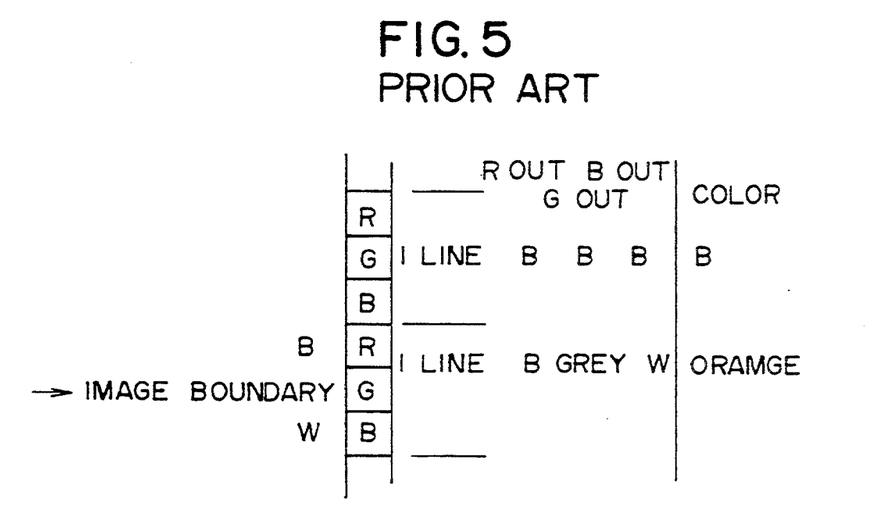
FIG. 5 is a diagram for explaining the appearance of a singular color at the boundary of an object in the image read by the optical scanner of FIG. 4.

On the other hand, when there is a deviation from the principle of additive mixture of color stimuli as in the image reading illustrated in FIG. 3 or FIG. 5, there appears a color not included in the framework of additive mixture of color stimuli at the boundary part of the image read by the scanner, and there appears a violation of the relationship of Eqs.(5)–(7). Thus, the checking of the relationship in Eqs.(5)–(7) provides an opportunity for checking whether the image reading has been done successfully or not. Further, there is a possibility of compensation for such a color deviation or noise color by imposing the relationship of Eqs.(5)–(7) to the value of the parameters $k_{1r}$ and $k_{2r}$, $k_{1g}$ and $k_{2g}$, and $k_{1b}$ and $k_{2b}$.

FIG. 16 shows a flowchart according to a second embodiment of the present invention for conducting the color noise reduction according to the foregoing principle.

Referring to FIG. 16, an object such as the object 2 is extracted in a step 11 from an image read by a scanner, and a background as well as a boundary of the extracted object is detected in a step 12. Next, in a step 13, the color $C_1$ of the background, the color $C_2$ of the object and the color $C_{12}$ of the boundary are detected in a step S13. Further, in a step S14, the coefficients $k_{1r}$, $k_{1g}$ and $k_{1b}$ are evaluated in a step S14. Further, in a step S15, a discrimination is made whether the value of these parameters $k_{1r}$, $k_{1g}$, $k_{1b}$ is smaller than zero or exceeds 1, and if the result is YES, the value of the parameter is compulsorily set to a predetermined value. For example, the parameter $k_{1r}$ is compulsorily set to 1 when the value of the parameter obtained in the step S14 exceeds 1. Further, when the value of the parameter is found to be smaller than zero, the parameter is compulsorily set to zero. Alternatively, the parameter $k_{1r}$ is compulsorily set to 0.5 when it was found that the value of the parameter does not fall in the range between zero and one. Of course, the same argument applies to the other parameters $k_{1g}$, $k_{1b}$ as well as to the parameters $k_{2r}$, $k_{2g}$ and $k_{2b}$.

Further, the parameters thus obtained are stored in a memory in a step 17.

FIG. 17 shows the process for modifying the boundary color and corresponds to the step 6 of FIG. 11.

Referring to FIG. 17, the modification of color of the object and/or color image synthesis is achieved in a step 21 as usual, and the parameters $k_{1r}$, $k_{1g}$ and $k_{1b}$ are retrieved from the memory in a step 22. Next, in a step 23, the boundary color $C_{12}$ or $C_{12}'$ is calculated in a step 23 according to the relationship of Eqs.(1)–(4) for each color component, and the color signals thus produced are stored in the video memory 12 described with reference to FIG. 9.

Figure 18:
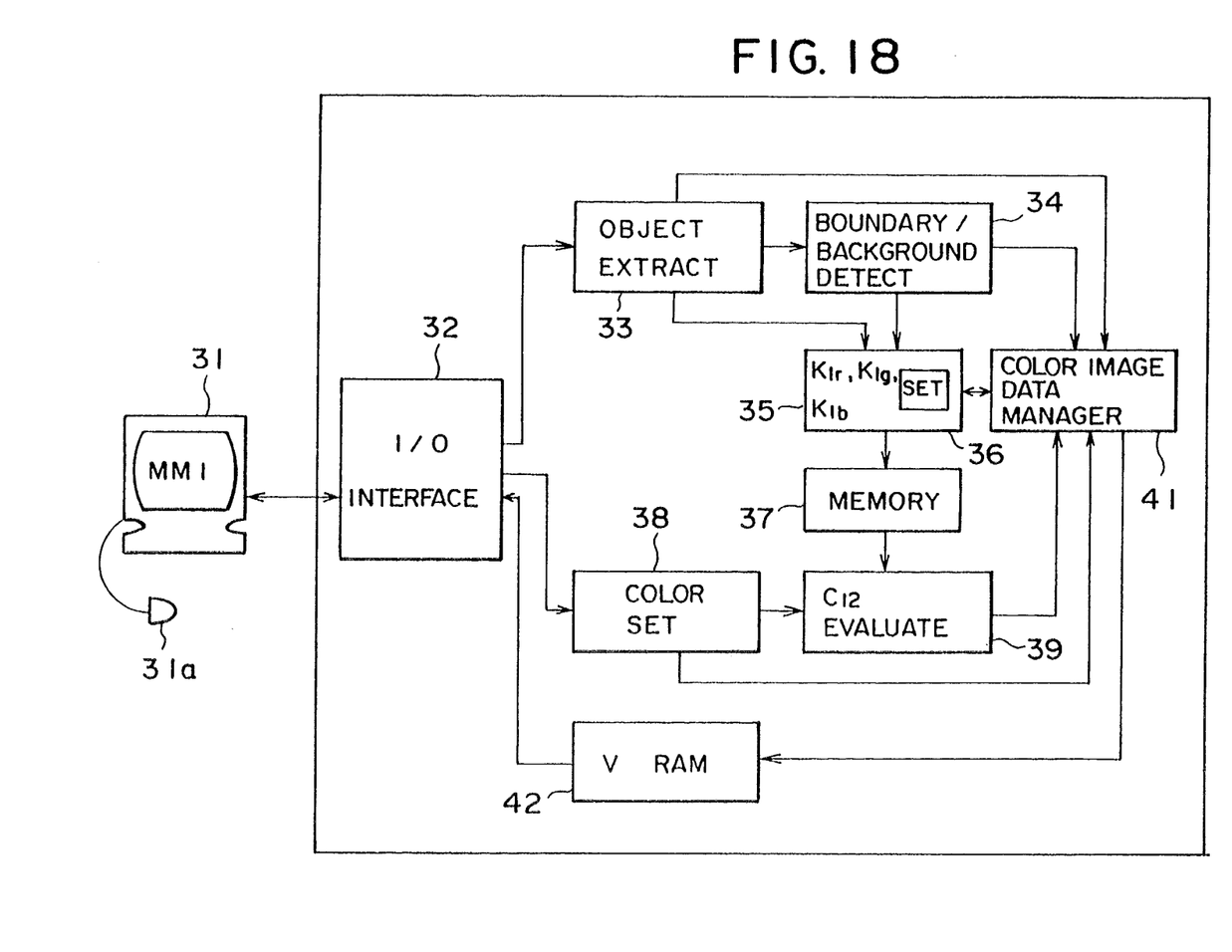
FIG. 18 is a diagram showing the construction of the image processing apparatus used in the second embodiment of the present invention.

FIG. 18 shows a functional block diagram of a system for implementing the process of the second embodiment, based upon the hardware construction of FIG. 9.

Referring to FIG. 18, the system includes a man-machine interface 31 corresponding to the display 22 and other related devices as well as drivers not illustrated in FIG. 9, and there is provided a mouse 31a as a pointing device that cooperates with the man-machine interface 31. The man-machine interface 31 is connected to the processing system by an input/output interface 32 that may include an image memory 11 of FIG. 9, and there is provided an object extraction unit 33 and a boundary detection unit 34, wherein the object extraction unit 33 corresponds collectively to the units 11–20 of FIG. 9 while the boundary detection unit 34 corresponds to the boundary detection unit 14 of FIG. 9.

Further, the system of FIG. 18 includes a processing unit 35 that calculates the value of the parameters $k_{1r}$, $k_{1g}$ and $k_{1b}$ based upon respective color components of the color signals $C_1$, $C_2$ and $C_{12}$. There, the processing unit 35 includes a parameter setting unit 36 that sets the value of any of the parameters $k_{1r}$, $k_{1g}$ and $k_{1b}$ when the value of these parameters does not fall in the range given by Eqs.(5)–(7). For example, the value of a parameter such as the parameter $k_{1g}$ is set to zero when the value of the same parameter was found to be a negative value as already described. Similarly, when the value of a parameter such as the parameter $k_{1b}$ was found to be a value exceeding one (1), the parameter is set to one (1). Alternatively, the parameter may be set to 0.5 whenever a violation of the rule given by Eqs.(5)–(7) has occurred. The parameters $k_{1r}$, $k_{1g}$ and $k_{1b}$ thus obtained are stored in a memory 36.

When synthesizing an image or modifying the color of an existing image, the user points the object of which color is to be modified or the object that is pasted on a new background, by means of the pointing device 31a. There, the new color of the object or the desired color of the background is selected by a color setting unit 38, and the evaluation of the boundary color that appears at the boundary of the object as a result of the foregoing image processing is achieved in the boundary color evaluation unit 39. Further, the colors that are selected by the unit 38 as well as the boundary color obtained by the unit 39 are both supplied to a color image data manager 41 wherein the modification of the color image takes place based upon the original color image supplied from the unit 33 and the boundary image supplied from the unit 34. Further, the color image produced by thee unit 41 is supplied to a video memory 42 corresponding to the video memory 12 of FIG. 9, and the image thus modified and/or synthesized is supplied to the man-machine interface 31 via the input/output interface unit 32 and is displayed on the monitor that forms a part of the man-machine interface 31. There, it will be noted that the units 35–41 correspond to the unit 21 of FIG. 9.

In the foregoing second embodiment, one may obtain an average value $(K_1)_{av}$ of $k_{1r}$, $k_{1g}$ and $k_{1b}$ as well as an average value $(k_2)_{av}$ of $k_{2r}$, $k_{2g}$ and $k_{2b}$ and use the same in Eqs.(1')–(3') for obtaining the boundary color as $$R_e = (k_1)_{av} \cdot R_o + (k_2)_{av} \cdot R_b, \quad (8)$$

$$G_e = (k_1)_{av} \cdot G_o + (k_2)_{av} \cdot G_b, \quad (9)$$

and $$B_e = (k_1)_{av} \cdot B_o + (k_2)_{av} \cdot B_b, \quad (10)$$

Alternatively, one may use a medium value of $k_{1r}$, $k_{1g}$ and $k_{1b}$ for the parameter $(K_1)_{av}$ and a medium value of $k_{2r}$, $k_{2g}$ and $k_{2b}$ for the parameter $(k_2)_{av}$ in Eqs.(8)–(10). Further, one may select the color component that shows a largest difference between the object and the background, and use the parameters such as $k_{1g}$ and $k_{2g}$ obtained for the color component thus selected, also for the mixing of other color components. It should be noted that one can evaluate the parameters representing the ratio of color mixing accurately by selecting the color component that changes conspicuously between the object and the background. Thereby, the effect of noise is minimized.

Further, the present invention is not limited to the embodiments described heretofore, but various variations and modifications may be made without departing from the scope of the invention.

What is claimed is:

1. A method implemented by a computing device for changing a color of an object that is surrounded at least partially by a background having a color, wherein the object is defined by a boundary, said method comprising the steps of:
    (a) identifying pixels forming said boundary;
    (b) identifying a boundary color for said pixels forming said boundary;
    (c) obtaining a mixing ratio for mixing the color of said object and the color of said background to produce said boundary color, said step of obtaining the mixing ratio comprising the steps of identifying an object color of pixels forming said object, identifying a background color of pixels forming said background, and calculating said mixing ratio from said object color, said background color and said boundary color;
    (d) changing said object color relative to said background color to implement a color change process; and
    (e) changing said boundary color for the pixels forming said boundary while maintaining said mixing ratio substantially constant before and after said color change process.

2. A method as claimed in claim 1, in which said step of changing the color is achieved by changing the color of the object while maintaining the color of the background substantially constant.

3. A method as claimed in claim 1, in which said step of changing the color is achieved by changing the color of the background while maintaining the color of the object substantially constant.

4. A method as claimed in claim 3, in which said step of changing the color is achieved by removing said object from a first background having a first background color and implanting into a second background having a second background color.

5. A method as claimed in claim 1, in which said step of obtaining the mixing ratio comprises the steps of: representing the boundary color by means of a linear interpolation between the color of the object and the color of the background; and calculating the mixing ratio based upon said linear interpolation.

6. A method as claimed in claim 5, in which said step of representing the boundary color is achieved in the red-green-blue R-G-B color space.

7. A method as claimed in claim 5, in which said step of representing the boundary color is achieved in the CIELUV space.

8. A method as claimed in claim 5, in which said mixing ratio is obtained for the color component that changes most significantly between said object and said background.

9. A method as claimed in claim 8, in which said mixing ratio obtained for the color component that changes the most is used also for other color components as the mixing ratio.

10. A method as claimed in claim 1, in which said method further comprises a step of imposing a predetermined range for the mixing ratio and setting the mixing ratio to a predetermined value when the value of the mixing ratio obtained in the step (b) falls outside said predetermined range.

11. A method as claimed in claim 10, in which said mixing value is compulsorily set to a maximum value that the mixing value can take when it was found that the mixing ratio obtained in said step (b) is larger than any value in said predetermined range, said mixing value being further set compulsorily to a minimum value that the mixing value can take when it was found that the mixing ratio obtained in said step (b) is smaller than said predetermined range.

12. A method as claimed in claim 10, in which said mixing value is set compulsorily to an intermediate value between the maximum and minimum of said predetermined range when it was found that the mixing ratio obtained in the step (b) falls outside said predetermined range.

* * * * *